United States Patent [19]

Kasparek et al.

[11] Patent Number: 4,551,040
[45] Date of Patent: Nov. 5, 1985

[54] APPARATUS FOR TRANSPORTING ROD-SHAPED ARTICLES BETWEEN THE DISCHARGE ENDS OF PNEUMATIC CONVEYOR PIPES AND A PROCESSING MACHINE

[75] Inventors: Alois Kasparek, Hamburg; Jürgen Burger, Marschacht, both of Fed. Rep. of Germany

[73] Assignee: Hauni-Werke Körber & Co. Kg., Hamburg, Fed. Rep. of Germany

[21] Appl. No.: 160,289

[22] Filed: Jun. 17, 1980

[30] Foreign Application Priority Data

Jul. 3, 1979 [DE] Fed. Rep. of Germany ....... 2926792

[51] Int. Cl.⁴ ...................... B65G 53/66; B65G 51/02
[52] U.S. Cl. ..................................... 406/28; 198/444; 198/448; 406/10; 406/70; 406/77
[58] Field of Search ...................... 406/10, 28, 70, 77, 406/82, 154; 198/347, 444, 448, 452, 524, 572; 131/282, 283

[56] References Cited

U.S. PATENT DOCUMENTS

| | | | |
|---|---|---|---|
| 3,222,110 | 12/1965 | Kelly et al. | 406/82 |
| 3,397,922 | 8/1968 | Dearsley | 406/70 |
| 3,495,696 | 2/1970 | Molins et al. | 198/448 |
| 3,608,972 | 9/1971 | Rudszinat | 406/70 |
| 4,042,112 | 8/1977 | Molins et al. | 198/448 X |
| 4,099,608 | 7/1978 | McCombie | 198/572 X |

FOREIGN PATENT DOCUMENTS

| | | |
|---|---|---|
| 2641934 | 3/1977 | Fed. Rep. of Germany. |
| 1159794 | 7/1969 | United Kingdom ............... 198/572 |

Primary Examiner—Jeffrey V. Nase
Attorney, Agent, or Firm—Peter K. Kontler

[57] ABSTRACT

The outlets of pneumatic pipes in a transporting unit which delivers filter rod sections from a filter rod making machine and wherein the sections move axially admit successive sections into a separating unit wherein the speed of sections is uniformized and the sections are separated from each other by clearances of preselected length prior to entry into the corresponding channels of a deflecting unit which changes the direction of movement of each section from axial to sidewise movement and directs the sections into a junction zone. The latter admits a multi-layer stream of parallel sections which move sideways onto the upper reach of an endless belt conveyor which delivers the stream to a processing machine. The speed of the conveyor is regulated in dependency on the rate at which the deflecting unit receives sections from the separating unit so that the rate of delivery of sections to the processing machine matches the rate of delivery of articles to the separating and deflecting units.

9 Claims, 1 Drawing Figure

U.S. Patent  Nov. 5, 1985  4,551,040
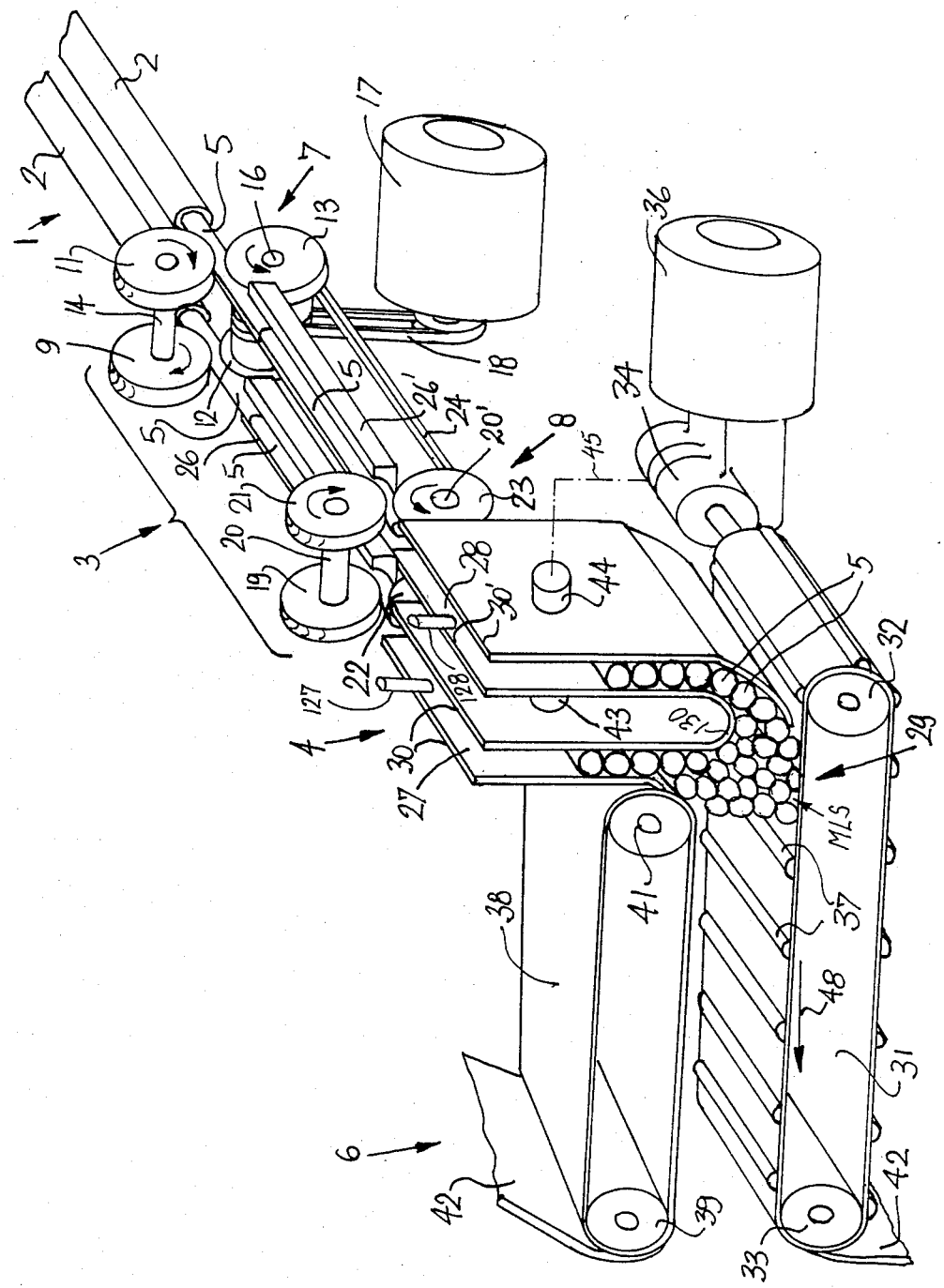

APPARATUS FOR TRANSPORTING ROD-SHAPED ARTICLES BETWEEN THE DISCHARGE ENDS OF PNEUMATIC CONVEYOR PIPES AND A PROCESSING MACHINE

CROSS-REFERENCE TO RELATED APPLICATION

The apparatus which is described in the specification and shown in the drawing of the present application is identical with that which is described and shown in our commonly owned copending application Ser. No. 168,292 filed July 11, 1980 now U.S. Pat. No. 4,372,710, issued 2/8/83.

BACKGROUND OF THE INVENTION

The present invention relates to apparatus for transporting rod-shaped articles, especially for transporting plain or filter tipped cigarettes, cigars or cigarillos, filter rod sections or analogous commodities which constitute or form part of rod-shaped smokers' products. More particularly, the invention relates to improvements in apparatus for delivering rod-shaped articles from plural outlets of a pneumatic transporting unit to one or more consuming or processing machines, such as one or more filter tipping, filter plug storing, cigarette storing or analogous machines. Still more particularly, the invention relates to improvements in apparatus for receiving rod-shaped articles from the discharge ends of discrete pipes of a pneumatic transporting unit and for converting such articles into a stream whose components move sideways on to one or more processing or consuming stations.

Not too long ago, the majority of apparatus for transporting rod-shaped articles from one or more producing machines to one or more processing or consuming machines utilized so-called chargers or trays which were loaded or filled at the producing machine and whose contents were dumped into the magazine or other storing means of the associated consuming or processing machine. For example, it was customary to employ chargers or trays for the transport of filter rod sections from a filter rod making machine to a filter tipping machine wherein the sections are severed to yield filter plugs which are assembled with plain cigarettes, cigars or cigarillos to form therewith filter tipped smokers' products. At the present time, such apparatus are often replaced with pneumatic transporting units which comprise one or more elongated pneumatic conveyor pipes serving to transport filter rod sections or other rod-shaped smokers' products axially from a sender to a receiving station. The sender is located at the outlet of the producing machine, and the receiving station is located at the inlet of the processing or consuming machine. The receiving station is equipped with means for accepting rod-shaped articles which are delivered by the conveyor pipes so that they move axially and for converting the arriving articles into component parts of a stream wherein the articles move sideways and are ready to enter the magazine of the producing or consuming machine.

German Offenlegungsschrift No. 2,641,934 discloses a receiving station which accepts a single file of rod-shaped articles from the discharge end of a pneumatic conveyor pipe and includes a braking device which serves to slow down the oncoming articles immediately downstream of the outlet of the pneumatic pipe. The purpose of the braking device is to reduce the speed of all articles to a given value before the articles enter an accelerating device which increases the speed of successive axially moving articles so that each preceding article is separated from the next-following article by a clearance of predetermined width. Such clearances between successive rod-shaped articles of the single file of coaxial articles are desirable in order to allow for unimpeded reorientation of successive foremost articles, i.e., to enable each foremost article to change the direction of its movement from axial movement to sidewise movement without any interference on the part of the next-following article (which latter article continues to move axially while the preceding article begins and continues to move sideways). The deflection or change in orientation of successive articles of the file is effected by a deflecting device which receives the articles while the articles move axially (i.e., which receives a file of coaxial articles) and discharges a stream of articles wherein the articles advance sideways. The deflecting device has a channel wherein the articles of the single file descend under the action of suitable deflecting or orientation changing instrumentalities.

A drawback of the just described conventional apparatus is that their output is relatively low, i.e., one such apparatus must be provided for each pipe of a pneumatic transporting unit. Moreover, if the transporting unit is defective, the associated processing or consuming machine must be arrested because the delivery of rod-shaped articles to its magazine is interrupted practically immediately after the transporting unit ceases to operate in the prescribed manner.

Recent versions of processing or consuming machines for filter rod sections or other types of commodities which constitute or form part of rod-shaped smokers' products can process inordinately large numbers of articles per unit of time. Thus, it is quite customary to operate a processing machine at a speed at which the machine turns out at least one hundred smokers' products per second. The same holds true for the machines which produce rod-shaped smokers' products, e.g., for filter rod making machines or for machines which turn out plain cigarettes, cigars or cigarillos. When a high-speed producing machine is to be coupled to a high-speed processing or consuming machine, the apparatus for transfer of articles from the producing to the processing machine must be capable of delivering articles at a rate which is sufficiently high to accept the entire output of the producing machine as well as to satisfy the requirements of the processing machine. U.S. Pat. No. 3,222,110 discloses an apparatus which serves to transport cigarettes and whose pneumatic transporting unit comprises several discrete pipes for the transport of cigarettes which move axially, one after the other, from a sender to a receiving station. The receiving station defines several paths for the advancement of cigarettes therethrough, namely, a discrete path for each pipe of the pneumatic transporting unit. The receiving station comprises a braking device, an accelerating device and a deflecting device. The arrangement is such that each of these devices defines several paths for the transport of cigarettes from the respective conveyor pipes. The deflecting device delivers cigarettes sideways into a junction zone which is immediately adjacent to the inlet of a cigarette packing machine. The apparatus which are disposed at the receiving station of the just described patented structure are not adjustable so that any regulation of the rate at which the articles leave the junction zone is neither contemplated nor possible.

OBJECTS AND SUMMARY OF THE INVENTION

An object of the invention is to provide a novel and improved receiving station which can accept the output of a multi-track pneumatic transporting unit and can deliver rod-shaped articles to one or more processing or consuming machines at the same rate at which it accepts articles from the transporting unit.

Another object of the invention is to provide a high-capacity receiving station which can be installed between producing and processing or consuming machines whose output is very high so that the rate at which the articles which are turned out by the producing machine are advanced to the processing machine is also high and necessitates the provision of a high-capacity apparatus for reception, manipulation and delivery of articles.

A further object of the invention is to provide an apparatus which can be installed at or in the aforementioned receiving station and can form and deliver an uninterrupted stream or an analogous formation or array of rod-shaped articles to the processing or consuming machine.

Another object of the invention is to provide a relatively simple and compact apparatus which is less prone to malfunction than heretofore known apparatus and which can be designed to deliver to one or more processing machines a continuous flow of articles in the form of a single-layer or multi-layer stream wherein the articles move sideways.

An additional object of the invention is to provide an apparatus of the above outlined character which is especially suited to transport and/or otherwise manipulate filter rod sections, especially filter rod sections which are to be admitted into the magazine of a filter tipping machine.

The invention is embodied in an apparatus for delivering filter rod sections or other rod-shaped articles which constitute or form part of smokers' products from a plurality of outlets (e.g., discharge ends of discrete conveyor pipes) of a pneumatic transporting unit wherein the articles move axially to a processing or consuming machine which the articles enter by moving sideways. The apparatus is installed at a receiving station and comprises means for deflecting successive articles which are delivered by the outlets of the transporting unit so as to cause the deflected articles to move sideways, means defining a junction zone for reception of the thus deflected articles, and a conveyor system for sidewise transport of articles from the junction zone to the processing machine. Thus, contrary to earlier proposals, the junction zone is not located immediately at or ahead of the inlet to the processing or consuming machine but delivers articles sideways to a conveyor system which, in turn, transports the articles to the processing or consuming machine.

The deflecting means preferably comprises a plurality of channels (e.g., in the form of upright ducts), one for each outlet of the pneumatic transporting unit. The channels have openings (e.g., open lower ends) for admission of articles into the junction zone. The conveyor system includes a conveyor (e.g., an endless belt conveyor with a substantially horizontal upper reach) having a receiving end, and the junction zone is disposed in the region of such receiving end. For example, the junction zone can be provided with outlet means for delivery of a (single- or multi-layer) stream of parallel articles directly to the receiving end of the conveyor. Alternatively, the junction zone can be installed slightly upstream of the receiving end of the conveyor, as considered in the direction of advancement of articles from the deflecting means to the processing machine.

The apparatus preferably further comprises means for monitoring the rate of delivery of articles from the outlets of the transporting unit to the deflecting means and/or the rate of transport of articles through the deflecting means and for generating signals which are indicative of such rate of delivery. The conveyor system then comprises the aforementioned conveyor which receives articles from the junction zone and means for regulating the speed of the conveyor in response to the aforementioned signals so that the speed decreases when the rate decreases and vice versa. This renders it possible to conform the rate of delivery of articles from the junction zone to the processing machine to the rate of delivery of articles to the deflecting means. Thus, an advantage of a conveyor system between the junction zone and the processing machine is that the speed of the conveyor or conveyors in the conveyor system can be regulated to ensure that the quantity of articles which leave the junction zone per unit of time (i.e., which are delivered to the processing machine per unit of time) is the same as the quantity of articles which are delivered by the transporting unit within the same interval of time.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a somewhat schematic perspective view of an apparatus which embodies one form of the invention and whose deflecting means receives two files of rod-shaped articles from the outlets of discrete pipes of a pneumatic transporting unit.

DESCRIPTION OF THE PREFERRED EMBODIMENTS

The drawing shows a receiving station for elongated rod-shaped articles 5 which constitute filter rod sections. Such sections are transported from a filter rod making machine (not shown) to a filter tipping machine, e.g., from a filter rod making machine of the type known as KDF 2 to a filter tipping machine of the type known as MAX 80. Such machines are manufactured and distributed by the assignee of the present application.

The receiving station is disposed at the discharge ends of several (e.g., two) pneumatic conveyor pipes 2 which form part of a pneumatic transporting unit 1 and each of which conveys a file of coaxial filter rod sections 5 to a separating unit 3 at the receiving station. The manner in which the sections 5 are introduced into the pipes 2 by the sender and in which the sections 5 are advanced in the pipes 2 forms no part of the present invention. Such pneumatic conveyor pipes are well known and are used in many plants for the manufacture and/or processing of rod-shaped smokers' products. Pneumatic transporting units are used increasingly as substitutes for trays or chargers which were popular one and two decades ago and some of which are still in use in certain cigarette making plants.

The separating unit 3 constitutes one of the assemblies which are installed at the receiving station. The latter further accommodates a deflecting or direction changing unit 4 as well as a conveyor system 6 which delivers a continuous stream of filter rod sections 5 to the consuming machine, e.g., to the aforementioned filter tipping machine wherein the sections are severed to yield filter plugs which are assembled with plain cigarettes, cigars or cigarillos to form filter tipped smokers' products which are tested for the purpose of segregating defective smokers' products from satisfactory products.

The purpose of the separating unit 3 is to increase the spacing (i.e., to provide clearances) between successive sections 5 of each of the two files of sections, i.e., between the sections which issue from the discharge end of one as well as between the sections which issue from the discharge end of the other pipe 2. Such clearances are desirable and advantageous because the purpose of the deflecting unit 4 is to change the direction of movement of successive sections 5 so that the sections which were advanced by moving axially through and beyond the pipes 2 are caused to move sideways not later than when such sections enter the conveyor system 6. The change in direction of movement from axial to sidewise movement is much less likely to entail damage to or a pileup of sections 5 if the sections are spaced apart during the last stage of axial movement, i.e., during movement from the discharge ends of the pipes 2 into the conveyor system 6.

The separating unit 3 comprises an advancing device 7 which serves to uniformize the speed of filter rod sections 5 upstream of the deflecting unit 4. The advancing device 7 delivers sections 5 to an accelerating device 8 of the separating unit 3, and the development of clearances between successive sections 5 of each of the two files of sections takes place in the accelerating device 8. The advancing device 7 comprises two pairs of rollers 9, 11 and 12, 13 which are respectively mounted on shafts 14 and 16. The shaft 14 and 16 are parallel to each other and their axes are located in a plane which is normal to the direction of advancement of sections 5 issuing from the discharge ends of the pipes 2, i.e., from the outlets of the transporting unit 1. The rollers 9 and 11 are idler rollers, i.e., they are free to rotate in the directions indicated by the arrows, either with or relative to the shaft 14 which is journalled in the frame of the apparatus including the units 1, 3, 4 and the system 6. The lower shaft 16 is fixed to the respective rollers 12, 13 and is driven in a counterclockwise direction, as viewed in the drawing, at a predetermined speed which may approximate or match the speed of lengthwise movement of sections 5 in the pipes 2. The shaft 16 is driven by a prime mover 17 (e.g., a variable-speed electric motor) through the medium of a belt or chain transmission 18. The rollers 9 and 11 are respectively coplanar with the rollers 12 and 13 so that the peripheral surfaces of the rollers 9, 12 can engage the wrappers of successive sections 5 which issue from one of the pipes 2 and the peripheral surfaces of the rollers 11, 13 can engage the wrappers of successive sections 5 issuing from the other pipe 2. The distance between the central plane of the rollers 9, 12 and the central plane of the rollers 11, 13 equals the distance between the axes of the parallel pipes 2. It is clear that each of the shafts 14 and 16 carries three or more rollers if the pneumatic transporting unit 1 comprises three or more conveyor pipes 2.

The accelerating device 8 is located immediately downstream of the separating device 7 and comprises two pairs of rollers 19, 21 and 22, 23. The rollers 19 and 21 are mounted on a common shaft 20 which is parallel to the shafts 14, 16 and is freely rotatable in the frame of the apparatus if the rollers 19 and 21 are rigidly secured thereto. If the rollers 19 and 21 are rotatable relative to the shaft 20, the latter can be fixedly installed in the frame. The common shaft 20' for the rollers 22 and 23 is parallel to the shaft 20 and is driven by the prime mover 17 through the medium of a second belt or chain transmission 24 in such a way that the peripheral speed of the rollers 22 and 23 exceeds the peripheral speed of the rollers 12 and 13 when the prime mover 17 is on. The sections 5 which advance from the gap between the rollers 9, 12 of the advancing device 7 to the gap between the rollers 19, 22 of the accelerating device 8 are guided by an elongated trough 26 which is parallel with one of the pipes 2, and the sections 5 which advance from the gap between the rollers 11, 13 toward the gap between the rollers 21, 23 are guided by a second elongated trough 26' which is parallel with the trough 26. The troughs 26, 26' or analogous guide means between the rollers of the devices 7 and 8 are optional but desirable and advantageous, especially if the distance between the common plane of the axes of shafts 14, 16 and the common plane of the axes of shafts 20, 20' is rather pronounced.

It will be noted that the separating unit 3 defines several paths for the delivery of filter rod sections 5 from the pipes 2 of the pneumatic transporting unit 1 to the deflecting or direction changing unit 4. One such path is defined by the rollers 9, 12, by the flute of the trough 26 and by the rollers 19, 22. The other path is defined by the rollers 11, 13, by the flute of the trough 26' and by the rollers 21, 23. As mentioned above, the apparatus can comprise a transporting unit with three or more pipes 2; the number of the just discussed paths is then increased accordingly.

The deflecting unit 4 comprises two upright channels or ducts 27 and 28 wherein the sections 5 can descend by gravity and/or with assistance from suitable deflecting instrumentalities. For example, the ducts 27 and 28 can contain nozzles 127, 128 which are connected to a source (not shown) of compressed air or another gaseous fluid serving to change the direction of movement of successive sections 5 which issue from the gaps between the rollers 19, 22 and 21, 23. Alternatively, the ducts 27 and 28 can contain mechanical (e.g., wedgelike) deflecting elements having suitably inclined surfaces along which the wrappers of the sections 5 slide on entry into the ducts 27 and 28 so that the direction of movement of each filter rod section is changed from axial to sidewise movement, i.e., from a movement which has a single component of movement in the direction of the axis of the respective pipe 2 to a movement having a component in a direction at right angles to the axes of the sections 5 advancing toward the upper ends of the ducts 27 and 28. The ducts 27 and 28 are respectively flanked by pairs of parallel vertical walls 30 and 30'. The inner walls 30, 30' can form part of a one-piece U-shaped structure whose rounded lower end portion 130 bounds a portion of a junction zone 29 serving to receive sections 5 from the ducts 27 and 28.

Deflectors which can be used in the ducts 27 and 28 to direct the oncoming filter rod sections 5 into the junction zone 29 are disclosed, for example, in the aforementioned German Offenlegungsschrift No. 2,641,934. If desired, each of these ducts can accommodate or be associated with two or more types of deflectors in order to further reduce the likelihood of improper orientation of sections 5 which are about to enter the junction zone 29. For example, the aforementioned wedge-like mechanical deflectors can be provided with suction ports to reduce the likelihood of rebounding of the leaders of sections 5 when such leaders come into contact with mechanical deflectors in or above the ducts 27 and 28.

The junction zone 29 is disposed at the receiving end of a relatively wide belt conveyor 31 which forms part of the conveyor system 6 and serves to advance a multi-layer stream MLS of sections 5 in the direction which is indicated by the arrow 48, i.e., into the magazine or another suitable receptacle or container of a filter tipping or other consuming machine. The upper reach of the belt conveyor 31 transports the sections 5 sideways, and such sidewise transport of sections is enhanced and promoted by the provision of transverse ribs or analogous protuberances 37 which are secured to the external surface of the belt conveyor 31. The latter is trained over pulleys 32, 33 and is driven, when necessary, by a prime mover 36 (e.g., a variable speed electric motor) through the medium of a suitable transmission 34. The transmission 34 can drive the pulley 32 at a relatively low first speed or at a higher second speed. If the apparatus which is shown in the drawing comprises a transporting unit 1 with three or more pipes 2 and with an equal number of roller pairs in the devices 7 and 8, as well as with an equal number of ducts in the deflecting unit 4, the transmission 34 is designed to drive the pulley 32 at three or more different speeds, depending on the number of ducts which deliver filter rod sections 5 to the junction zone 29, i.e., depending on the quantity of sections which the belt conveyor 31 receives per unit of time.

It is within the purview of the invention to design the junction zone 29 in such a way that the upper reach of the conveyor 31 in the system 6 receives a single layer or parallel filter rod sections 5. The provision of a junction zone which converts several discrete streams or rows of sections 5 into a multi-layer stream MLS is preferred in many instances, e.g., when the conveyor 31 need not deliver filter rod sections directly to the magazine of a filter tipping or like machine but rather to a device for temporary storage and curing of filter rod sections. For example, the conveyor 31 can be used for delivery of a multi-layer stream of filter rod sections 5 to the intake of a reservoir system known as RESY which is manufactured and distributed by the assignee of the present application. The ribs 37 ensure that all sections 5 on the upper reach of the conveyor 31 are properly oriented, at least in that layer of the stream MLS which is nearest to the conveyor 31.

The height of the multi-layer stream MLS on the upper reach of the conveyor 31 is limited by the lower reach of a cover 38 which, in the embodiment shown in the drawing, is an endless belt conveyor trained over pulleys 39 and 41. These pulleys need not be driven even though it is possible to provide a motion transmitting connection between the shafts for the pulleys 32 and 41 so that the speed of the conveyor 38 matches that of the conveyor 31 and the lower reach of the conveyor 38 advances in the direction of the arrow 48. The lower reach of the conveyor 38 is preferably parallel to the upper reach of the conveyor 31.

The reference characters 42 denote portions (e.g., walls) of a machine which receives successive increments of the stream MLS when the prime mover 36 is on and the transmission 34 transmits torque to the shaft for the pulley 32. Such machine may constitute the aforediscussed filter tipping machine or the aforementioned reservoir system. If the consuming or processing machine is a filter tipping machine (e.g., the aforementioned MAX 80), the parts denoted by the reference characters 42 may constitute portions of the walls of a magazine which stores a supply of filter rod sections in the filter tipping machine.

The apparatus further comprises means for regulating the speed of the conveyor 31, i.e., for changing the ratio of the transmission 34 in dependency on the rate at which the deflecting unit 4 delivers filter rod sections 5 to the junction zone 29. The regulating means comprises monitoring means with signal generating elements 43 and 44 (preferably photocells with sources of light and aligned photoelectronic transducers for the generation of electrical signals) which are respectively installed in or associated with the ducts 27 and 28. The reference character 45 denotes (in phantom lines) an operative connection between the element 44 of the monitoring means and the transmission 34. A similar operative connection (not shown) is provided between the photocell 43 and the transmission 34. The photocells 43 and 44 generate and transmit suitable signals when the level of the accumulated sections 5 in the respective ducts 27 and 28 rises to or descends below a preselected level. The preselected level in the duct 27 may but need not necessarily be the same as the preselected level in the duct 28.

The filter rod sections 5 which are admitted into and advance through and beyond the discharge ends of the pneumatic conveyor pipes 2 by moving lengthwise enter the gaps between the rollers 9, 12 and 11, 13 of the advancing device 7 whereby the speed of each of these filter rod sections decreases or increases to a predetermined value which is selected by the setting of the prime mover 17. In other words, the speed of each filter rod section 5 which advances beyond the gap between the rollers 9, 12 or 11, 13 matches a preselected speed which can be adjusted if the speed of the prime mover 17 is variable and/or if the connection between the output element of this prime mover and the shaft 16 includes a variable-speed transmission.

The filter rod sections 5 thereupon enter the gaps between the rollers 19, 22 and 21, 23 whereby the speed of lengthwise movement of each filter rod section is increased, again to a predetermined speed, so that the preceding sections are moved away from and define with the next-following sections of the respective files of sections clearances or spaces of predetermined width. The width of such clearances must suffice to ensure that the deflecting instrumentalities 127 and 128 can readily change the direction of movement of each oncoming section 5 from axial movement to sidewise movement in such a way that the next-following section cannot contact the preceding section. The troughs 26 and 26' ensure that the leader of each filter rod section 5 which has advanced beyond the rollers 9, 12 or 11, 13 of the advancing device 7 invariably finds its way into the gap between the rollers 19, 22 or 21, 23 of the accelerating device 8.

The filter rod sections 5 whose leaders have advanced beyond the gaps between the rollers 19, 22 and 21, 23 are acted upon by jets of compressed gas (normally air) issuing from the nozzles 127, 128 so that the sections 5 descend and come to rest on top of the rows of sections in the lower portions of the ducts 27 and 28. In other words, such sections then form part of the stream MLS in the junction zone 29. Thus, when the apparatus functions properly, the junction zone 29 continuously receives fresh filter rod sections 5 from two discrete paths, namely, from a path which includes the interior of the duct 27 and from a path which includes the interior of the duct 28.

The open lower end of the junction zone 29 delivers the stream MLS directly onto the upper reach of the conveyor 31 whose raised portions 37 ensure that the sections 5 extend at right angles to the direction which is indicated by the arrow 48. If the operation of the apparatus is proper, the transmission 34 drives the shaft of the pulley 32 at the higher of the two speeds because the conveyor 31 must remove the output of the entire pneumatic transporting unit 1, i.e., the conveyor 31 must transport all of the filter rod sections 5 which are delivered by the pipes 2 while such pipes receive filter rod sections at a maximum rate.

As mentioned above, the height of the stream MLS is limited by the lower reach of the cover or conveyor 38 which may but need not be driven to move its lower reach in the direction indicated by the arrow 48. If the conveyor 38 is not positively driven, its lower reach begins to move in the direction of arrow 48 only when it is engaged by the uppermost layer of the stream MLS. The discharge end of the conveyor 31 delivers the sections 5 into the magazine of the aforementioned processing or consuming machine, namely, into a magazine or a like receptacle including the walls 42.

The monitoring means including the photocells 43 and 44 guarantees that the quantity of filter rod sections 5 per unit length of the stream MLS will not change or changes only negligibly even if the rate at which the pneumatic transporting unit 1 delivers filter rod sections to the separating unit 3 fluctuates within a rather wide range. The conveyor 31 can deliver the stream MLS at several speeds (or it can come to a full stop); however, the height of the stream MLS remains practically or substantially unchanged by the simple expedient of varying the speed of the conveyor 31 as a function of the rate at which the junction zone 29 receives sections 5 from the ducts 27 and 28. When the photocell 43 detects that the height of the row of sections 5 in the respective duct 27 has decreased below a preselected level, it transmits a signal to the transmission 34 which reduces the speed of the shaft for the pulley 32 (and hence the speed of the conveyor 31) accordingly. Analogously, the photocell 44 transmits a signal via connection or conductor means 45 when the uppermost section 5 of the row of sections in the duct 28 is located below a preselected level. If the photocell 44 transmits a signal simultaneously with the transmission of a signal from the photocell 43, i.e., if the level of the supply of sections 5 in each of the two ducts 27, 28 has descended below a preselected value, the transmission 34 disengages the shaft of the pulley 32 from the output element of the prime mover 36 and/or arrests the prime mover 36 so that the conveyor 31 comes to a halt. Fluctuations of the height of the row of filter rod sections 5 in the duct 27 and/or 28 can be attributed to malfunctioning of the pneumatic transporting unit 1, to malfunctioning of instrumentalities at the sender which delivers sections 5 into the inlets of the pipes 2, and/or to malfunctioning of the separating unit 3. If the apparatus is designed to deliver to the junction zone 29 filter rod sections 5 or other rod-shaped smokers' products along three or more discrete paths, the speed of the pulley 32 (and hence the speed of the conveyor 31) is varied between three, four or more values, depending upon the number of paths which deliver rod-shaped articles in a desired or optimum manner. In the illustrated embodiment which provides two discrete paths for the delivery of sections 5 to the junction zone 29, the speed of the conveyor 31 can vary between a normal or higher speed, a second or reduced speed which is half the normal speed, and zero speed. If the apparatus defines five paths and four of the five paths fail to deliver rod-shaped articles at the desired or customary rate (i.e., if the level of the uppermost rod-shaped article in four of five discrete ducts is below the predetermined value), the speed of the conveyor corresponding to the conveyor 31 is reduced by 80 percent.

It will be noted that the regulating means including the photocells 43 and 44 ensures that the rate at which the conveyor 31 delivers filter rod sections 5 or other rod-shaped articles to the consuming or processing machine always matches the rate at which the pneumatic transporting unit 1 delivers rod-shaped articles to the advancing device 7 of the separating unit 3.

The improved apparatus exhibits a number of important advantages. Thus, the apparatus can deliver a large number of rod-shaped articles per unit of time and the orientation of all articles is the same. Moreover, the apparatus can be designed to transport rod-shaped articles along any desired practical number of discrete paths, and its conveyor 31 or an analogous conveyor can deliver the articles sideways in the form of a stream having any desired height, i.e., in the form of a single-layer or multi-layer stream. Still further, the apparatus is simple and compact and is not prone to malfunction. Furthermore, the apparatus can continue with the delivery of rod-shaped articles to a processing machine even if one or more parts of the transporting unit 1 (it being assumed that the unit 1 can comprise two, three or more pipes 2) are out of commission. If one or more pipes of the unit 1 are clogged or cease to deliver filter rod sections or other rod-shaped articles for any other reason, the processing machine which is located downstream of the conveyor 31 continues to receive rod-shaped articles as long as at least one pipe of the unit 1 continues to feed rod-shaped articles to the respective part of the separating unit 3. Such mode of operation is normally preferred to intermittent delivery of articles to the processing machine, i.e., to full stoppage of the conveyor 31 whenever the rate at which the unit 1 transports articles to the separating unit 3 changes.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for delivering rod-shaped articles, particularly filter rod sections, which constitute or form part of smokers' products to a processing machine which the articles enter by moving sideways, comprising a pneumatic transporting unit including several pneumatic conveyor pipes for moving rod-shaped articles axially and having discharge ends for such articles; means for deflecting successive articles which are delivered by said discharge ends so as to cause the deflected articles to move sideways by gravity, said deflecting means comprising a plurality of upright ducts, one for each pipe of said transporting unit; means defining a junction zone for reception of the thus deflected articles, said ducts having lower ends with openings for admission of articles directly into said junction zone and said junction zone being disposed immediately below said ducts and including means for accumulating a multi-layer stream of articles whose articles move sideways; and a conveyor system for sidewise transport of the multi-layer stream from said junction zone to the processing machine.

2. The apparatus of claim 1, wherein said conveyor system includes a conveyor having a receiving end and said junction zone is disposed in the region of said receiving end.

3. The apparatus of claim 2, wherein said junction zone has outlet means for delivery of articles directly to the receiving end of said conveyor.

4. The apparatus of claim 2, wherein said junction zone is located upstream of said receiving end, as considered in the direction of advancement of articles from said deflecting means to the processing machine.

5. The apparatus of claim 1, further comprising means for monitoring the rate of delivery of articles from the discharge ends of said pipes to said deflecting means and for generating signals denoting said rate of delivery, said conveyor system including a conveyor and means for regulating the speed of said conveyor in response to said signals so that the speed decreases when said rate decreases and vice versa.

6. The apparatus of claim 1, further comprising separating means for establishing clearances between successive articles which are delivered by the outlets of said transporting unit, said separating means being disposed between said pipes and said deflecting means.

7. Apparatus for delivering rod-shaped articles, particularly filter rod sections, which constitute or form part of smokers' products to a processing machine which the articles enter by moving sideways, comprising a pneumatic transporting unit including several pneumatic conveyor pipes for moving rod-shaped articles axially and having discharge ends for such articles; means for deflecting successive articles which are delivered by said discharge ends so as to cause the deflected articles to move sideways, said deflecting means comprising a plurality of upright ducts, one for each pipe of said transporting unit; means defining a junction zone for reception of the thus deflected articles, said ducts having lower ends with openings for admission of articles directly into said junction zone and said junction zone including means for accumulating a multi-layer stream of articles whose articles move sideways; means for monitoring the rate of delivery of articles from the discharge ends of said pipes to said deflecting means and for generating signals denoting the rate of delivery, said monitoring means comprising level detectors arranged to scan the height of accumulations of articles in said ducts; and a conveyor system for sidewise transport of the multi-layer stream from said junction zone to the processing machine, said conveyor system including a conveyor and means for regulating the speed of said conveyor in response to said signals so that the speed decreases when said rate decreases and vice versa.

8. The apparatus of claim 7, wherein said monitoring means includes means for arresting said conveyor in response to interruption of delivery of articles by all of said pipes.

9. The apparatus of claim 7, wherein level detectors include photocells.

* * * * *